United States Patent [19]
Fauth et al.

[11] 4,147,421
[45] Apr. 3, 1979

[54] COLLAPSIBLE CAMERA

[75] Inventors: Günter Fauth, Unterhaching; Peter Lermann, Narring, both of Fed. Rep. of Germany

[73] Assignee: AGFA-Gevaert AG, Leverkusen, Fed. Rep. of Germany

[21] Appl. No.: 819,417

[22] Filed: Jul. 26, 1977

[30] Foreign Application Priority Data

Jul. 30, 1976 [DE] Fed. Rep. of Germany ....... 2634383

[51] Int. Cl.² .................... G03B 17/04; G03B 17/42; G03B 17/52
[52] U.S. Cl. ..................... 354/192; 354/86; 354/204; 354/212
[58] Field of Search ................................... 354/83–86, 354/187, 192–194, 204, 208, 212

[56] References Cited
U.S. PATENT DOCUMENTS

| | | | |
|---|---|---|---|
| 1,372,803 | 3/1921 | Dietz | 354/204 |
| 3,906,521 | 9/1975 | Ueda | 354/86 |

*Primary Examiner*—John Gonzales
*Attorney, Agent, or Firm*—Michael J. Striker

[57] ABSTRACT

A collapsible camera has a lens mount which is pivoted on the camera body and can move between an open and a shut position. An arcuate drive segment is composed of at least two segment parts, both of which pivot on the same pivot axis as the lens mount. These parts can move relative to one another and to the body and lens mount when the latter is opened and closed. The periphery of each part has serrations which engage with the teeth of a pinion that constitutes the input member of a film transporting mechanism so that the pinion is rotated in response to the pivoting movement of the lens mount.

11 Claims, 2 Drawing Figures

COLLAPSIBLE CAMERA

BACKGROUND OF THE INVENTION

1. Field of the Invention

This invention relates to photographic cameras of the collapsible type.

More particularly, the invention relates to a collapsible camera wherein a film transporting mechanism is operated in response to relative movement of the camera body and a lens mount which is connected to the same.

2. The Prior Art

Various proposals have been made for transporting film in still cameras, particularly in the types of cameras which are generically known as instant-picture cameras. It has been suggested to use an electrically operated transporting mechanism, or to utilize a crank which is turned by hand when film is to be transported. Slidable elements have been proposed in lieu of the crank.

In one camera which is collapsible, i.e., where a lens mount is movable relative to the camera body between a collapsed (shut) and an extended (open) position, the proposal has been made to effect film transportation as a function of the movement of the lens mount relative to the camera body. This can be done by e.g., providing an arcuate gear segment which pivots with the lens mount about a pivot axis thereof and which drives a step-up gearing that in turn rotates a set of film transporting rollers.

This is basically a rather satisfactory proposal. It does, however, have some disadvantages which require correction. The recent public demand is for smaller and more compact cameras. The size limitations which are imposed on camera housings by this requirement make it impossible to use a relatively large arcuate gear segment. On the other hand, the relatively small gear segments which can be accommodated in these scaled-down housings have two problems: the length of their serrated arcuate periphery (from which motion is transmitted to the film transporting mechanism) is generally insufficient to effect film advancement over the requisite distance during a single movement of the lens mount relative to the body — and the forces acting on these short-radius segments are so high that it is impracticable to make the segments of inexpensive (but relatively low-strength) materials, such as synthetic plastics. This latter factor is especially important in instant-picture cameras where the film transporting mechanism includes a pair of nip rollers which not only advance each film but squeeze developer fluid out of a pouch at one end of the film to spread it (during film transport) over the film area to be developed; this requires substantial force which must be transmitted to the mechanism via the gear segment.

SUMMARY OF THE INVENTION

It is an object of the invention to overcome the disadvantages outlined above.

More particularly, it is an object of the invention to provide an improved collapsible camera which avoids these disadvantages.

Another object of the invention is to provide a camera of the type in question, which utilizes a gear segment having a relatively large radius but which nevertheless has a compact camera housing or body.

An additional object of the invention is to provide such a camera wherein the gear segment can be of relatively inexpensive material.

In keeping with these objects, and with others which will become apparent hereafter, one feature of the invention resides in a camera, particularly (but not necessarily) an instant-picture camera, which comprises a camera body; a lens mount connected to the body and movable relative thereto between an extended and a retracted position; a film transporting mechanism having an input member; and means for driving the film transporting mechanism, comprising an arcuate drive segment having a serrated periphery engageable with the input member and at least two segment parts which are displaceable relative to one another and to the input member in response to movement of the lens mount between the positions thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
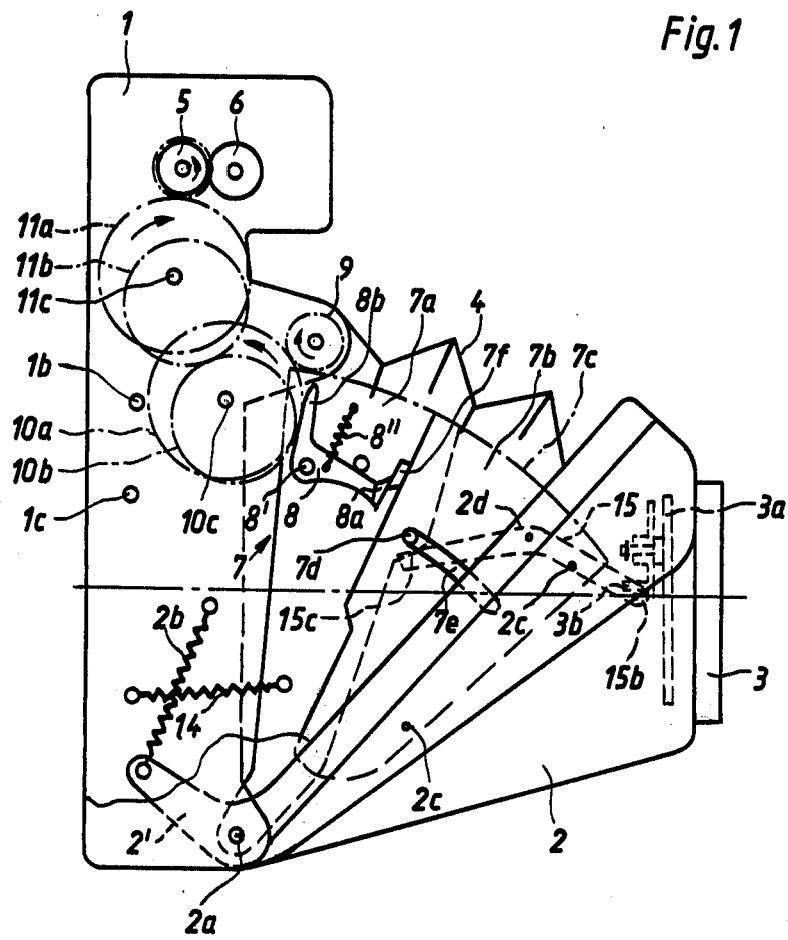
FIG. 1 is a diagrammatic broken-away side view of a camera embodying the invention, shown in open condition.
Figure 2:
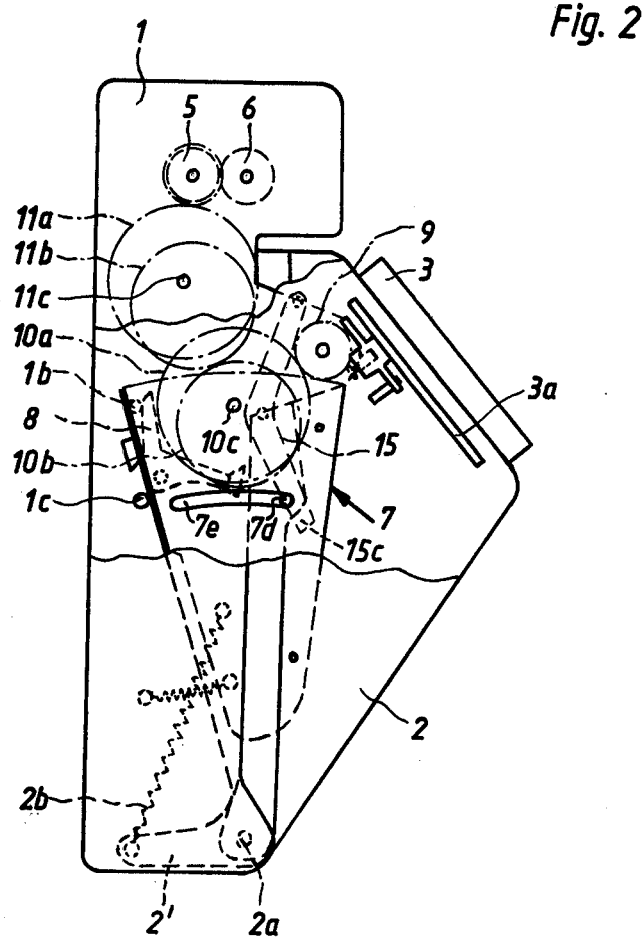
FIG. 2 is a view similar to FIG. 1 but showing the camera in closed position.

The camera shown in FIGS. 1 and 2 is of the collapsible type, having a camera body or housing 1 to which a (rigid) lens mount 2 is secured for pivotal movement about the axis defined by pivot 2a. To prevent the entry of light into the interior of the camera, the body 1 and the lens mount 2 are connected with one another by a bellows 4 (e.g., of rubberized cloth, synthetic plastic material or the like) in a manner known per se. The lens mount 2 carries a lens 3 and a shutter 3a having a shutter-cocking mechanism 3b. The lens, shutter and cocking mechanism are known per se and will therefore not be further described.

Although the concept of the invention is applicable to collapsible cameras in general, it has herein been illustrated in connection with an instant-picture camera having a pair of film-transporting nip rollers 5 and 6 between which each film (not shown) must pass subsequent to exposure, so that the rollers 5, 6 spread the developer fluid over the picture area of the film. For this purpose at least one of the rollers 5, 6 must be driven; here, the roller 5 is diagrammatically shown as being provided with a gear (at one axial end thereof). The roller 5 is driven in rotation (see the arrow) via a pinion 9 which transmits motion to a gear arrangement composed of two double gears 10a, 10b and 11a, 11b, respectively. Gears 10a and 10b are mounted for joint rotation on axis 10c; gears 11a, 11b are similarly mounted for joint rotation on axis 11c. The gears 10a and 11a are concentric to the respective axes 10c and 11c, whereas the gears 10b and 11b are eccentric relative thereto. The gears 10b, 11b mesh with one another; the gear 10a meshes with pinion 9 to be driven thereby and to drive the gears 10b, 11b which in turn drive the gear 11a that meshes with the gear on roller 5.

The lens mount 2 has a portion 2'. A spring 2b is connected to the portion 2' and also to the housing 1 in such a manner (note the locus of connection to the housing versus the locus of connections to portion 2') that the lens mount 2 is urged permanently towards its open position (FIG. 1). In the space between the facing walls of housing 1 and lens mount 2 there is arranged an arcuate gear segment 7 which is composed of at least two discrete parts 7a and 7b. Part 7b is riveted or otherwise secured to the lens mount 2 at 2c. It, as well as the part 7a, are pivotable about the pivot axis 2a (they could, however, be pivotable about a different axis). The parts 7a, 7b each have a serrated (toothed) periphery 7c which is concentric to the pivot axis 2a. Part 7b is provided with an arcuate slot 7e into which a projection 7d of part 7a slidably extends, so that the parts are pivotable relative to one another within the limits imposed by the guide arrangement 7d, 7e.

In the collapsed condition of the camera (FIG. 2) the parts 7a, 7b substantially overlap one another and therefore require relatively little space as considered in the direction from front to back of the camera. The camera housing can thus be compact. In the extended position, however (FIG. 1), the parts 7a, 7b do not overlap and thus have a (combined) periphery 7c of substantial arcuate length, i.e., of a length which is much greater than the individual length of the periphery of the respective parts 7a, 7b. Thus, even though in the collapsed condition the parts 7a, 7b require but little space, in the extended condition they together offer an arcuate periphery 7c which is sufficiently long (has enough teeth) so that motion can be imparted to the pinion 9 without undue stress on the parts 7a, 7b.

A double-armed lever 8 is pivoted to the part 7a at 8'; it is biased in anti-clockwise direction by a spring 8". When the camera is extended (open) the arm 8a of lever 8 engages in front of an abutment 7f of the part 7b, so that relative pivoting of the parts 7a, 7b is precluded. The part 7a, however, is permanently biased inwardly of the housing 7a by a spring 14. Another double-armed lever, identified with reference numeral 15, is pivoted to lens mount 2 at 2d; its arm 15b travels (when lever 15 is tilted) in a path in which it acts upon the shutter cocking mechanism 3b whereas its other arm 15c travels in a path in which it eventually abuts a projection 7d.

The Operation

Assuming that the camera is in the position of FIG. 1 and the lens mount 2 is pivoted towards closed position (i.e., to assume the position of FIG. 2), such (in FIG. 1 leftward) pivoting of the lens mount permits the part 7a to pivot in the same direction under the influence of spring 14. This continues until the arm 8b of lever 8 engages an abutment 1b of housing 1, as a result of which the lever 8 is now pivoted in clockwise direction counter to the action of spring 8". This causes the arm 8a to move away from the abutment 7f, so that (during the continued closing movement of lens mount 2) the part 7b can pivot relative to the part 7a. Since the parts are located in respective planes which, though close together, are nevertheless spaced from one another lengthwise of the pivot axis 2a (i.e., normal to the plane of FIG. 1), the part 7b moves in front of (as considered with reference to the viewer of FIG. 1) the part 7a, until part 7b engages an abutment 1c on housing 1. Before the teeth on the periphery of part 7a become disengaged from the pinion 9, the teeth on the periphery of part 7b move into such engagement, i.e., there is an overlap which prevents loss of pinion rotation. Of course, the cooperation of pawl 8 and abutment 7f will be appropriately selected to make this possible. Also, the projection 7d engages the arm 15c of lever 15 and pivots the latter to the position shown in FIG. 2; during this movement the arm 15b cocks the shutter 3a via the shutter-cooking mechanism 3b.

When the camera is subsequently to be re-opened, i.e., when the lens mount 2 is pivoted to the position of FIG. 1, the part 7b pivots with the lens mount and eventually pulls along the part 7a via the guide 7d, 7e. The projection 7d allows returning the arm 15c of lever 15 from the position of FIG. 2 to the position of FIG. 1 (the shutter remains cocked in a manner known per se). Finally, the arm 8a of pawl 8 snaps back into position with respect to abutment 7f and the camera is ready for use. While the pinion 9 and rollers 5, 6 were turned during the closing movement, a free-wheeling device interposed in the motion-transmitting train between pinion and rollers (such devices are known per se and require no discussion) prevents the rotation during the opening of the camera.

The camera according to the invention meets the objects outlined earlier herein. It permits the use of a space-saving gear segment which, due to the substantial arcuate length of periphery 7c in the operative position of parts 7a, 7b, can nevertheless be made of inexpensive, relatively low-strength material. The length of periphery 7c is adequate to assure that during a single closing of the camera a respective film is fully transported through the nip between the rollers 5, 6. Parenthetically it should be noted here that film transporting mechanisms of instant-picture cameras usually have a hook or gripper which serves to push each film out of the film pack and into the nip of rollers 5, 6. This has not been shown herein since it is known per se.

The invention is susceptible of various modifications which are intended to be encompassed in the protection sought. For example, the gear transmission interposed between the pinion 9 and the roller 5 could be different from the illustrated one. Still further, the lever 15 could be used to cock an energy-storing device which, when triggered, operates a flash bulb or cube (piezo-electric effect due to impact resulting from the energy-release by the storing device). Also, the lever 15 could be made to operate an energy-storing as well as a shutter-cocking device.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera, particularly an instant-picture camera, a combination comprising a camera body; a lens mount connected to said body and movable relative thereto between an extended and a retracted position; a film transporting mechanism having an input member; and means for driving said film transporting mechanism, comprising an arcuate drive segment having a serrated periphery engageable with said input member and being composed of at least two segment parts which are each provided with a portion of said serrated periphery and are displaceable relative to one another and to said input member in response to movement of said lens mount between said positions thereof.

2. A combination as defined in claim 1, wherein said lens mount is connected to said body for pivotal movement between said positions about a pivot axis.

3. A combination as defined in claim 2, wherein said segment parts are mounted for pivotal movement about said pivot axis.

4. A combination as defined in claim 1, wherein said input member is a pinion.

5. A combination as defined in claim 1; further comprising a pawl on one and a cooperating abutment on the other of said segment parts and arranged so that during relative displacement of said segment parts the serrations on one overlap the serrations on the other of said parts during a portion of said relative displacement.

6. A combination as defined in claim 1, further comprising a pawl on one and a cooperating abutment on the other of said segment parts and arranged to latch said segment parts against relative displacement upon movement of said lens mount to said extended position.

7. A combination as defined in claim 6; and further comprising an abutment portion on said camera body and positioned to engage said pawl upon movement of said lens mount towards said retracted position, for disengaging said pawl from said cooperating abutment so as to restore relative displacement of said segment parts.

8. A combination as defined in claim 1, wherein said lens mount carries a mechanism; and further comprising means for operating said mechanism in response to movement of said lens mount relative to said camera body.

9. A combination as defined in claim 8, wherein said operating means comprises a lever having a first and a second arm and being tiltable to and from a position in which said second arm operates said mechanism, and a projection on one of said segment parts positioned to engage said first arm and tilt said lever to said position thereof in response to said movement of said lens mount relative to said camera body.

10. A combination as defined in claim 9, one of said segment parts being proximal to said body and the other of said segment parts being proximal to said lens mount in the extended position of the latter, said projection being on said one segment part and said lever being on said lens mount.

11. A combination as defined in claim 9, wherein said mechanism is a shutter-cocking mechanism.

* * * * *